United States Patent
Ueno et al.

(10) Patent No.: US 8,770,369 B2
(45) Date of Patent: Jul. 8, 2014

(54) VEHICLE SHIFT CONTROL DEVICE

(75) Inventors: Koki Ueno, Toyota (JP); Keisuke Sekiya, Toyota (JP); Mitsuaki Ishimaru, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 50 days.

(21) Appl. No.: 13/697,087

(22) PCT Filed: May 11, 2010

(86) PCT No.: PCT/JP2010/057976
§ 371 (c)(1),
(2), (4) Date: Nov. 9, 2012

(87) PCT Pub. No.: WO2011/142000
PCT Pub. Date: Nov. 17, 2011

(65) Prior Publication Data
US 2013/0072350 A1 Mar. 21, 2013

(51) Int. Cl.
*B60W 10/10* (2012.01)
*F16H 63/48* (2006.01)

(52) U.S. Cl.
CPC .................. *F16H 63/483* (2013.01)
USPC .................................... 192/219.4

(58) Field of Classification Search
CPC ........ F16H 63/483; F16H 61/22; F16H 19/00
See application file for complete search history.

(56) References Cited

U.S. PATENT DOCUMENTS

| 4,561,527 | A | * | 12/1985 | Nakamoto et al. | 192/219.4 |
| 2009/0176619 | A1 | | 7/2009 | Inoue | |
| 2010/0274454 | A1 | | 10/2010 | Nishimura et al. | |
| 2012/0252628 | A1 | * | 10/2012 | Tsutsumi et al. | 477/19 |
| 2012/0305360 | A1 | * | 12/2012 | Kitaori et al. | 192/219.4 |
| 2012/0309590 | A1 | * | 12/2012 | Kanai et al. | 477/92 |
| 2013/0072350 | A1 | * | 3/2013 | Ueno et al. | 477/111 |

FOREIGN PATENT DOCUMENTS

| JP | 6-40517 | 5/1994 |
| JP | 7-18065 | 3/1995 |
| JP | 2007-170546 | 7/2007 |
| JP | 4179388 | 9/2008 |
| JP | 2009-144833 | 7/2009 |

* cited by examiner

*Primary Examiner* — Dirk Wright
(74) *Attorney, Agent, or Firm* — Finnegan, Henderson, Farabow, Garrett & Dunner, LLP

(57) ABSTRACT

It is provided a vehicle shift control device electrically switching a shift position between a parking position and a non-parking position, the vehicle being capable of switching a vehicle state among a first state, a second state and a third state, when an operation for switching the vehicle state is performed in the first state, if a vehicle speed is a predetermined speed or less, switching is executed to the parking position and, after completion of the switching, the vehicle state is switched to the third state, whereas when plural-times of the operations are performed successively during the vehicle running, the vehicle state is compulsorily switched to the second state, and when at least one operation of the plural-times of the operations is performed if the vehicle speed is the predetermined speed or less, switching to the parking position is executed prior to switching to the second state.

20 Claims, 7 Drawing Sheets

VEHICLE SHIFT CONTROL DEVICE

CROSS-REFERENCE TO RELATED APPLICATIONS

This application is a national phase application of International Application No. PCT/JP2010/057976, filed May 11, 2010, the content of which is incorporated herein by reference.

TECHNICAL FIELD

The present invention relates to a vehicle shift control device for electrically switching a shift position associated with vehicle running by actuating a parking lock device.

BACKGROUND ART

A shift control device for vehicle is well known that employs a so-called shift-by-wire (SBW) system actuating a parking lock device based on a predetermined request signal, to electrically switch a shift position associated with vehicle running between a parking position and a non-parking position. One example is a vehicle control device described in Patent Document 1. Patent Document 1 describes that if for example a condition of "power switch short-press+predetermined vehicle speed or less" is satisfied, a so-called auto-P action of "switch to parking position+power off (ignition off and accessary power off)" is executed. It further describes that if for example a condition of "power switch long-press" is met, an emergency stop process of "ignition off (accessary power on)" is executed. Accordingly, even if for example the vehicle is running beyond a predetermined vehicle speed, "power switch long-press" enables the vehicle power supply state to turn into a power state disabling the vehicle from running.

PRIOR ART DOCUMENT

Patent Document

Patent Document 1: Japanese Laid-Open Patent Publication No. 2009-144833
Patent Document 2: Japanese Laid-Open Utility Model Publication No. 6-40517
Patent Document 3: Japanese Laid-Open Utility Model Publication No. 7-18065
Patent Document 4: Japanese Laid-Open Patent Publication No. 2007-170546
Patent Document 5: Japanese Patent Publication No. 4179388

SUMMARY OF THE INVENTION

Problem to be Solved by the Invention

By the way, the emergency stop process may be executable by a mode other than the "power switch long-press". For example, the emergency stop process may be executable by "plural-times of successive power switch short-presses". In the case, however, where the user executes the "plural-times of successive power switch short-presses" with the aim of the auto-P action (for example, in anticipation of falling to the predetermined vehicle speed or below during the short-presses) or accidentally regardless of the intention of a single short-press operation, there may be a problem that the distinction between the auto-P action and the emergency stop process becomes difficult. Namely, the user's operational intention may not be accurately reflected. The above problem is unknown.

The present invention was conceived in view of the above circumstances as the background and an object thereof is to provide a vehicle shift control device capable of accurately reflecting the user's operational intention in electrical switching control to a parking position for a parking lock.

Means for Solving the Problems

To achieve the object, the present invention provides a vehicle shift control device (a) electrically switching a shift position associated with running of a vehicle between a parking position and a non-parking position through switching a parking lock device between a lock state and a non-lock state by actuating the parking lock device based on a predetermined request signal, (b) the vehicle being capable of switching a vehicle state among a first state for enabling the vehicle running, a second state for turning off a function associated with the vehicle running and turning on a function not associated with the vehicle running, and a third state for turning off both the function associated with the vehicle running and the function not associated with the vehicle running, (c) when an operation for switching the vehicle state is performed in the first state, on condition that a vehicle speed is a predetermined vehicle speed for determining a vehicle stop state or less, switching is executed from a shift position other than the parking position to the parking position and, after the completion of the switching, the vehicle state is switched to the third state, whereas when plural-times of the operations are performed successively during the vehicle running, the vehicle state is compulsorily switched to the second state, and (d) when at least one operation of the plural-times of the operations is performed on condition that the vehicle speed is the predetermined vehicle speed or less, switching to the parking position is executed prior to switching to the second state.

The Effects of the Invention

Consequently, in the case where on the condition that the vehicle speed is the predetermined vehicle speed or less, at least one operation is performed of the plural-times of the operations, the switching to the parking position is executed prior to the switching to the second state. In consequence, the switching to the parking position is securely executed against the existence of the risk that, when the vehicle state is compulsorily switched to the second state because the plural-times of the operations are performed during the vehicle running for example, the switching to the parking position may not be executed due to the second state regardless of the execution at the predetermined vehicle speed or less of at least one of the operations. In other words, when for example the user performs the plural-times of the operations at or near the predetermined vehicle speed in expectation of the switching to the parking position and the switching to the third state, the parking lock is executed in accordance with the user's intention so that the vehicle can be fixed. Thus, the user's operational intention can be precisely reflected on the electrical switching control to the parking position for the parking lock.

Preferably, when at least one operation of the plural-times of the operations is performed on the condition that the vehicle speed is the predetermined vehicle speed or less, the vehicle state is further switched from the second state to the third state after the completion of the switching to the parking position. Consequently, the battery can be properly prevented from dying due to the second state left as it is for example.

Namely, the switching to the third state is securely executed after the completion of the switching to the parking position, against the existence of the risk that, though the switching to the parking position is securely performed as a result of the execution of the switching to the parking position prior to the switching to the second state, the switching to the third state may not be performed after the completion of the switching to the parking position due to the execution of the compulsory switching to the second state.

Preferably, a vehicle state switching control device for switching the vehicle state and a parking lock control device for switching a state of the parking lock device between the lock state and the non-lock state based on the predetermined request signal are comprised, wherein when at least one operation of the plural-times of the operations is performed on the condition that the vehicle speed is the predetermined vehicle speed or less, the vehicle state switching control device executes the switching to the second state after an elapse of a predetermined switching time that is predetermined as a time up to the execution of the switching to the parking position by the parking lock control device. Consequently, against the existence of the risk that the interchange of the predetermined request signal or the actuation itself of the parking lock device may not be executed due to the execution of the compulsory switching to the second state, the compulsory switching to the second state is delayed by at least the predetermined switching time required for the interchange of the predetermined request signal and the actuation itself of the parking lock device so that the switching to the parking position becomes feasible.

Preferably, a momentary push-button switch operated to switch the vehicle state is comprised, wherein the operation for switching the vehicle state is a press operation of the push-button switch, wherein the plural-times of the operations are plural-times of successive press operations where each of operation intervals between the successive press operations is within a predetermined time and where number of times of the press operations is a predetermined number of times or more. Consequently, the user's operational intention can be precisely reflected.

Preferably, the vehicle state is a power supply state of the vehicle, wherein the first state is a power on state for enabling the vehicle running, wherein the second state is a partial power on state for turning off a power associated with the vehicle running and turning on a power not associated with the vehicle running, and wherein the third state is a power off state for turning off both the power associated with the vehicle running and the power not associated with the vehicle running. Consequently, the switching to the parking position is securely executed against the existence of the risk that, when the power supply state is compulsorily switched to the partial power on state because the plural-times of the operations are performed during the vehicle running for example, the switching to the parking position may not be executed due to the partial power on state regardless of the execution at the predetermined vehicle speed or less of at least one of the operations. In other words, when for example the user performs the plural-times of the operations at or near the predetermined vehicle speed in expectation of the switching to the parking position and the switching to the power off state, the parking lock is executed in accordance with the user's intention so that the vehicle can be fixed. Moreover, the power supply state is further switched from the partial power on state to the power off state after the completion of the switching to the parking position, thereby the battery can be properly prevented from dying due to the partial power on the partial power on state left as it is for example. Namely, the switching to the power off state is securely executed after the completion of the switching to the parking position, against the existence of the risk that, though the switching to the parking position is securely performed as a result of the execution of the switching to the parking position prior to the switching to the partial power on state, the switching to the power off state may not be performed after the completion of the switching to the parking position due to the execution of the compulsory switching to the partial power on state.

Preferably, the vehicle state is a power supply state of the vehicle, wherein the first state is a running power on state for performing the vehicle running, wherein the second state is a running power off state for disabling the vehicle running and turning on a power not associated with the vehicle running, and wherein the third state is a vehicle power off state for turning off both a power associated with the vehicle running and the power not associated with the vehicle running. Consequently, the switching to the parking position is securely executed against the existence of the risk that, when the power supply state is compulsorily switched to the running power off state because the plural-times of the operations are performed during the vehicle running for example, the switching to the parking position may not be executed due to the running power off state regardless of the execution at the predetermined vehicle speed or less of at least one of the operations. In other words, when for example the user performs the plural-times of the operations at or near the predetermined vehicle speed in expectation of the switching to the parking position and the switching to the vehicle power off state, the parking lock is executed in accordance with the user's intention so that the vehicle can be fixed. Moreover, the power supply state is further switched from the running power off state to the vehicle power off state after the completion of the switching to the parking position, thereby the battery can be properly prevented from dying due to the running power off state left as it is for example. Namely, the switching to the vehicle power off state is securely executed after the completion of the switching to the parking position, against the existence of the risk that, though the switching to the parking position is securely performed as a result of the execution of the switching to the parking position prior to the switching to the running power off state, the switching to the vehicle power off state may not be performed after the completion of the switching to the parking position due to the execution of the compulsory switching to the running power off state.

Preferably, a power control device for switching the power supply state and a parking lock control device for switching the lock state of the parking lock device between the lock state and the non-lock state of the parking lock device based on the predetermined request signal are comprised, wherein when at least one operation of the plural-times of the operations is performed on the condition that the vehicle speed is the predetermined vehicle speed or less, the power control device executes the switching to the partial power on state or to the running power off state after an elapse of a predetermined switching time that is predetermined as a time up to the execution of the switching to the parking position by the parking lock control device. Consequently, against the existence of the risk that the interchange of the predetermined request signal or the actuation itself of the parking lock device may not be executed due to the execution of the compulsory switching to the partial power on state or to the running power off state, the compulsory switching to the partial power on state or to the running power off state is delayed by at least the predetermined switching time required for the interchange of the predetermined request signal and the actuation itself of the parking lock device so that the switching to the parking position becomes feasible.

MODES FOR CARRYING OUT THE INVENTION

Figure 1:
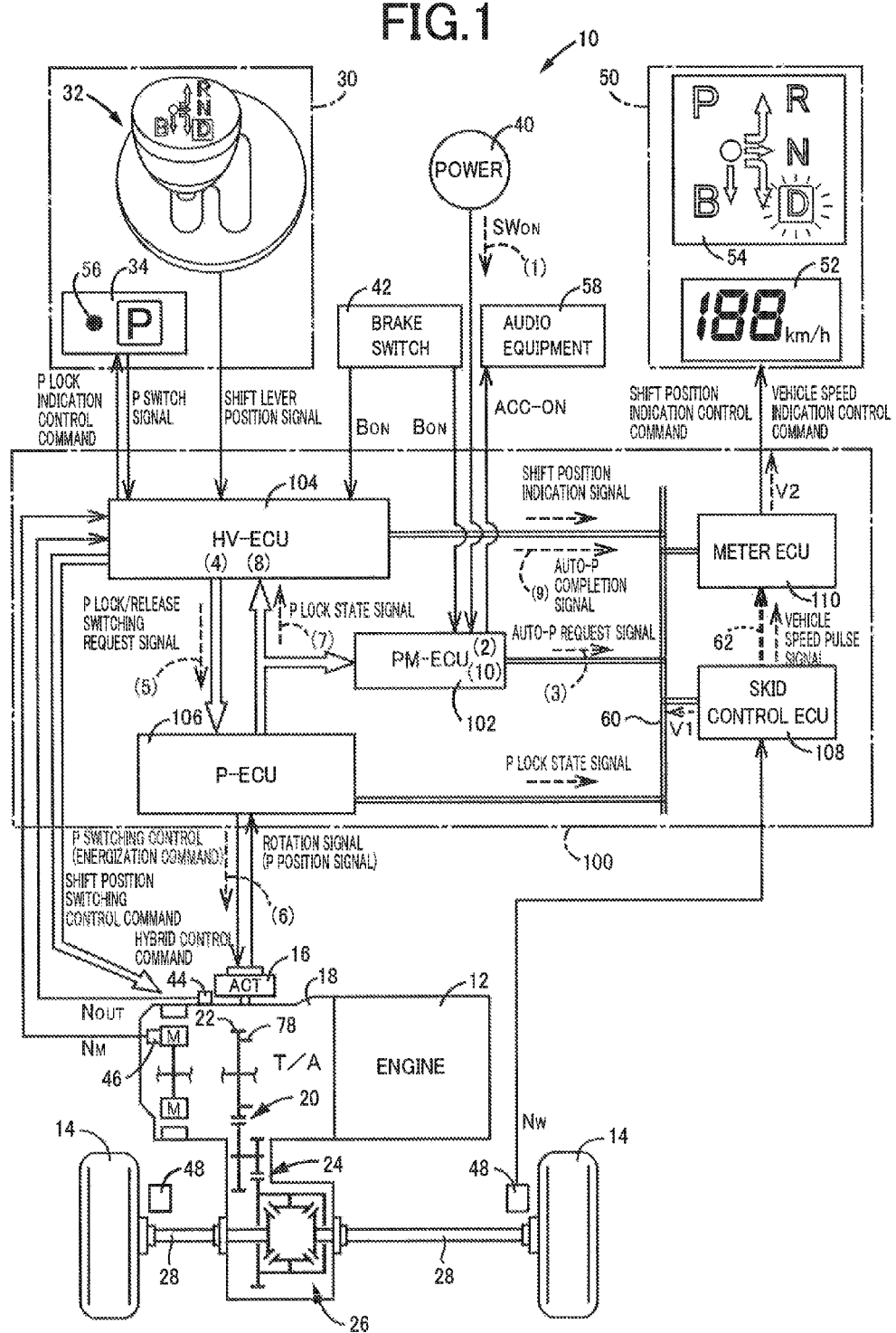
FIG. 1 is a diagram explaining a schematic configuration of a power transmission path that makes up a vehicle to which the present invention is applied, FIG. 1 being a block diagram explaining a principal part of a control system disposed on the vehicle for controlling a parking lock device, etc.

In the present invention, preferably, the vehicle transmits a power of a driving force source via a transmission to driving wheels. The transmission includes for example: various planetary gear type multi-stage transmissions having forward four stages, forward five stages, forward six stages, or more shift stages for example, in which a plurality of gear stages (shift stage) are alternatively achieved by selectively coupling rotary elements of plural sets of planetary gear sets by an engagement device; a synchronous mesh type parallel two axes transmission having plural pairs of shift gears meshing with each other at all times between two axes, in which any one of the plural pairs of shift gears is alternatively put into a power transmittable state by a synchronization device; a synchronous mesh type parallel two axes automatic transmission that is the synchronous mesh type parallel two axes transmission of a type allowing the shift stages to be automatically switched by the synchronization device driven by a hydraulic actuator; a so-called DCT (Dual Clutch Transmission) that is the synchronous mesh type parallel two axes automatic transmission of a type having dual input shafts to which are respectively coupled clutches which in turn are respectively coupled to even-numbered stages and odd-numbered stages; a so-called belt type continuously variable transmission having a transmitting belt acting as a power transmitting member that is wound around a pair of variable pulleys whose effective diameters are variable to vary the gear ratio continuously steplessly; a so-called traction type continuously variable transmission having a pair of cones rotating on a common axis and a plurality of rollers each rotatable around a rotation center intersecting with the common axis, the rollers being clamped between the pair of cones to vary the angle of intersection between the rotation center of each roller and the common axis to thereby vary the gear ratio; an automatic transmission functioning as a so-called electrically-operated continuously variable transmission having a differential mechanism in the form of a planetary gear set for example that distributes a power from an engine to a first electric motor and an output shaft and having a second electric motor disposed on the output shaft of the differential mechanism, differential actions of the differential mechanism being used to mechanically transmit a main part of the power from the engine to driving wheels and used to electrically transmit the remainder of the power from the engine via an electrical path from the first electric motor to the second electric motor, to thereby electrically vary the gear ratio; or an automatic transmission mounted on a so-called parallel hybrid vehicle having electric motors disposed on an engine shaft, an output shaft, etc. in a power transmittable manner. Widely used as the driving force source is an engine that is an internal combustion engine such as a gasoline engine and a diesel engine. An electric motor, etc. may be added as an auxiliary power source for running to the engine. As an alternative, the electric motor may be used solely as the driving force source for running.

An embodiment of the present invention will now be described in detail with reference to the drawings.

Embodiment 1

FIG. 1 is a diagram explaining a schematic configuration of a power transmission path from an engine 12 to driving wheels 14 that makes up a vehicle 10 to which the present invention is applied, FIG. 1 being a block diagram explaining a principal part of a control system disposed on the vehicle 10 for controlling a parking lock device 16, etc. Referring to FIG. 1, the vehicle 10 includes the parking lock device 16, a transmission 18, and a shift operation device 30 and employs a shift-by-wire (SBW) system electrically switching a shift position associated with the running of the vehicle 10, that is, the shift position (shift range) of the transmission 18. The transmission 18 is advantageously used for an FF (front-engine front-drive) vehicle having an engine transversely disposed in the vehicle 10 for example and transmits a power of the engine 12 that is the internal combustion engine as a driving force source for running from an output gear 22 as an output rotary member of the transmission 18 that is one of a counter gear-pair 20 to the pair of driving wheels 14 by way of, in sequence, the counter gear pair 20, a final gear pair 24, a differential gear 26, and a pair of axles (drive shafts (D/S)) 28, etc. that serve as a power transmission device. A transaxle (T/A) is composed of the transmission 18, the counter gear pair 20, the final gear pair 24, the differential gear 26, etc. Description will hereinafter be made of an example of the case where an electronic control device 100 of the present invention is applied to a hybrid vehicle having the engine 12 and an electric motor M as driving force sources. The electronic control device 100 of the present invention may, however, be applied to any type of vehicles such as an ordinary vehicle having engine, a hybrid vehicle, and an electric vehicle.

The vehicle 10 is provided with the electronic control device 100 that includes a vehicle shift control device for controlling the actuation state, etc. of the parking lock device 16. The electronic control device 100 is configured to include a so-called microcomputer having a CPU, a RAM, a ROM, an I/O interface, etc. for example. Utilizing a temporary storage function of the RAM, the CPU performs signal processing in accordance with a program previously stored in the ROM, to execute a hybrid drive control such as output control of the engine 12 and drive control of the electric motor M, a shift control of the transmission 18, a switching control of the shift position of the transmission 18 using the shift-by-wire system, a switching control of the actuation state of the parking lock device 16, etc.

The electronic control device 100 is supplied with for example: a shift lever position signal corresponding to an operation position $P_{SH}$ of a shift lever 32 from a shift sensor 36 and a select sensor 38 (see FIG. 2) that are position sensors for detecting the operation position $P_{SH}$; a P switch signal indicative of a switching operation in a P switch 34 operated by the user for switching the shift position of the transmission 18 from a non-P position other than a parking position (P position) to the P position; a P position signal indicative of the actuation state of a parking lock (P lock) in the parking lock device 16 for actuating or releasing the P lock to switch the shift position of the transmission 18 between the P position and the non-P position; a power switch signal $SW_{ON}$ indicative of a switching operation in a vehicle power switch 40 operated by the user for switching the switching state of power supply in the vehicle 10, that is, the power supply state thereof; a brake operation signal $B_{ON}$ indicative of a brake-on state from a brake switch 42 to indicate an operation of a foot brake pedal not depicted for detecting an actuation of a service braking system; an output rotation speed signal indicative of a rotation speed (output rotation speed) $N_{OUT}$ of the output gear 22 from an output rotation sensor 44; an electric motor rotation speed signal indicative of a rotation speed (electric motor rotation speed) $N_M$ of the electric motor M from an electric motor rotation sensor (resolver for example) 46; and a wheel speed pulse signal $N_W$ corresponding to a vehicle speed V indicative of a rotation speed (wheel speed) of each wheel from a wheel speed sensor 48.

The vehicle power switch 40 is a momentary push-button switch disposed in the vicinity of the driver's seat for example and operated to switch the power supply state of the vehicle 10. Accordingly, in this embodiment, the switching operation of the vehicle power switch 40 means a press operation of the push-button switch and, only during the press operation, the power switch signal $SW_{ON}$ is output, that is, the power switch signal $SW_{ON}$ goes on.

The electronic control device 100 issues for example: a hybrid control command signal such as an engine output control command signal for output control of the engine 12, a motor control command signal for drive control of the electric motor M in the transmission 18 and a shift control command signal for shift control of the transmission 18; a shift position switching control command signal for switching the shift position of the transmission 18; a vehicle speed indication control command signal for actuating a speedometer 52 disposed in a publicly known combination meter 50; a shift position indication control command signal for actuating a shift position indicator 54 disposed in the combination meter 50; a P lock indication control command signal for actuating a P position indicator lamp 56 to indicate a P lock state; and a P switching control command signal for switching control of the parking lock device 16.

Specifically, the electronic control device 100 includes a power control computer (hereinafter, referred to as "PM-ECU") 102, a hybrid control computer (hereinafter, referred to as "HV-ECU") 104, a parking control computer (hereinafter, referred to as "P-ECU") 106, a computer for electronically-controlled brake (hereinafter, referred to as "skid control ECU") 108, and a meter control computer (hereinafter, referred to as "meter ECU") 110, and the like.

The PM-ECU 102 functions as a vehicle state switching control device for switching the vehicle state based on a power switch signal $SW_{ON}$ from the vehicle power switch 40 operated by the user for example, that is, as a power control device for switching the power supply state of the vehicle 10 based on the signal. In this embodiment, the vehicle 10 can switch the vehicle state among for example: a first state for enabling the vehicle running; a second state for turning off functions associated with the vehicle running and turning on functions not associated with the vehicle running; and a third state for turning off both functions associated with the vehicle running and functions not associated with the vehicle running.

Specifically, the vehicle 10 can switch the power supply state among: a power on state (IG-ON state) as the first state for enabling the vehicle running by turning on the combination meter 50 for example; a partial power on state (ACC-ON state and IG-OFF state) as the second state for making some of functions of the vehicle 10 active by shutting off the power associated with the vehicle running by turning off the combination meter 50 for example, with the power not associated with the vehicle running remaining on; a power off state (ALL-OFF state and IG/ACC-OFF state) as the third state for making even the some of functions of the vehicle 10 inactive by shutting off both the power associated with the vehicle running and the power not associated with the vehicle running, for example. The partial power on state (ACC-ON state) and the power off state (ALL-OFF state) are both a running power off state (IG-OFF state) for disabling the vehicle running by shutting off the power associated with the vehicle running. The power off state (ALL-OFF state) is also an all-powers off state.

Making only some of functions of the vehicle 10 active in the partial power on state (ACC-ON state) is for example an energization for making a navigation system or audio equipment 58 active or an energization of a battery power extraction socket not depicted. The power on state (IG-ON state) is for example a state where the vehicle running can be controlled by a hybrid control command signal associated with the vehicle running and a running enabled state (READY-ON state) where the vehicle 10 can start and run if the accelerator is stepped on. Unless specifically differentiated, however, the power on state (IG-ON state) further includes a state where other functions are controllable than controlling the vehicle speed by the hybrid control command signal (for example, a state where the shift position of the transmission 18 is controllably switched) and a state where the engine 12 does not start up and the electric motor M does not work, that is, where the vehicle 10 cannot start and run even if the accelerator is stepped on. For example, the IG-ON state is a state where an ACC relay and an IG relay, which are not depicted, are both turned on by the PM-ECU 102 and the ACC-ON state is a state where only the ACC relay is turned on by the PM-ECU 102. For example, the ALL-OFF state is a state where the ACC relay and the IG relay are both turned off by the PM-ECU 102 and the IG-OFF state is a state where at least the IG relay is turned off by the PM-ECU 102.

Specifically, at the P position for example, when detecting an input of the power switch signal $SW_{ON}$ in a brake-on state $B_{ON}$, the PM-ECU 102 switches the power supply state of the vehicle 10 from any state to the IG-ON state (only the READY-ON state). At the P position, when the vehicle speed V is a predetermined vehicle speed V' or less (or is less than the predetermined vehicle speed V') in the IG-ON state and when detecting an input of the power switch signal $SW_{ON}$, the PM-ECU 102 performs switching of the power supply state of the vehicle 10 to the ALL-OFF state. At the P position, when detecting an input of the power switch signal $SW_{ON}$ in a state other than the brake-on state $B_{ON}$, the PM-ECU 102 switches the power supply state of the vehicle 10 in the order of the ALL-OFF state→the ACC-ON state→the IG-ON state (not including the READY-ON state)→the ALL-OFF state→ . . . for each input of the power switch signal $SW_{ON}$. At the non-P position, when in the ACC-ON state and when detecting an input of the power switch signal $SW_{ON}$, the PM-ECU 102 switches the power supply state of the vehicle 10 to the IG-ON state (not including the READY-ON state). At the non-P position, when the vehicle speed V is a predetermined vehicle speed V' or less in the IG-ON state and when detecting an input of the power switch signal $SW_{ON}$, the PM-ECU 102 outputs to the HV-ECU 104 an auto-P request signal as one of predetermined request signals for setting the shift position to P position, to actuate the parking lock device 16 for the execution of switching from the non-P position to the P position and, after the establishment of the P position (after the completion of switching to the P position), switches the power supply state of the vehicle 10 to the ALL-OFF state (these series of actions are referred to as the "auto-P action").

The predetermined vehicle speed V' is a vehicle stop determination vehicle speed (2 to 3 km/h for example) that is previously experimentally found and stored to determine that the vehicle is in the stop state for example and, therefore, it may be referred to as a predetermined stop vehicle speed. Accordingly, during the vehicle running where the vehicle speed V exceeds the predetermined vehicle speed V', regardless of the detection of an input of the power switch signal $SW_{ON}$, the PM-ECU 102 cancels the operation of the vehicle power switch 40 (that is, nullifies the power switch signal $SW_{ON}$ from the vehicle power switch 40) so as not to execute the "auto-P action". Note that when detecting the input of the power switch signal $SW_{ON}$ continuously for several seconds or more (3 sec or more for example) as a result of the user's long-press of the vehicle power switch 40 during the vehicle running (for example, during the vehicle running where the vehicle speed V exceeds the predetermined vehicle speed V'), the PM-ECU 102 compulsorily switches the power supply state of the vehicle 10 from the IG-ON state to the ACC-ON state (this action is referred to as "emergency stop process (or emergency IG-OFF action)"). The PM-ECU 102 executes the "emergency IG-OFF action" when the detection interval of the power switch signal $SW_{ON}$ is within (not more than) a predetermined time $T_{SW}$ through plural times of successive short-press operations of the vehicle power switch 40 by the user during the vehicle running and when detecting plural times of successive inputs of the power switch signal $SW_{ON}$ with the number of times of detection of the power switch signal $SW_{ON}$ being not less than a predetermined number of times $N_{SW}$. The detection interval corresponds for example to an interval between the last operation and the current operation of the vehicle power switch 40 and is a time from the rise of the last power switch signal $SW_{ON}$ to the rise of the current power switch signal $SW_{ON}$. The predetermined time $T_{SW}$ is a switch operation determination interval (1 sec for example) that is previously experimentally found and stored for determining that the operation is a continuous operation of the vehicle power switch 40 by the user for example. The predetermined number of times $N_{SW}$ is a successive switch operation determination number of times (3 times for example) that is previously experimentally found and stored for determining that the operations are successive switch operations (successive switch short-presses) intentionally performed by the user for vehicle stop for example. When executing the "emergency IG-OFF action", the PM-ECU 102 outputs a signal for setting the shift position to a neutral position (N position) to the H-ECU 104.

The HV-ECU 104 provides overall control of the actions of the transmission 18 for example. When the power supply state of the vehicle 10 is switched to the IG-ON state (only the READY-ON state) by the PM-ECU 102 for example, the HV-ECU 104 activates a hybrid system for enabling the vehicle running to output a hybrid control command associated with the vehicle running to the engine 12, the electric motor M, and the transmission 18 for the vehicle running control. Based on a shift lever position signal corresponding to an operation position $P_{SH}$ from the shift sensor 36 and the select sensor 38, the HV-ECU 104 outputs a shift position switching control command to the transmission 18 for the switching of the shift position. At this time, if the shift position of the transmission 18 is at the P position, the HV-ECU 104 outputs to the P-ECU 106 a P release switching request signal as one of predetermined request signals for switching the shift position of the transmission 18 from the P position to the non-P position based on the shift lever position signal. The HV-ECU 104 outputs to the P-ECU 106 a P lock switching request signal as one of predetermined request signals for switching the shift position of the transmission 18 from the non-P position to the P position based on a P switch signal from the P switch 34. The HV-ECU 104 outputs to the P-ECU 106 the P lock switching request signal for switching the shift position of the transmission 18 from the non-P position to the P position based on the auto-P request signal from the PM-ECU 102. The HV-ECU 104 outputs a shift position indication signal for indicating the state of the shift position to the meter ECU 110. The HV-ECU 104 outputs to the P switch 34 a parking lock indication control command signal (P lock indication control command signal) for indicating that the shift position state is the P lock state (P position), based on a P lock state signal indicative of being P position from the P-ECU 106, to turn on the P position indicator lamp 56 in the P switch 34 to clearly indicate that the shift position state is the P lock state.

To switch the shift position between the P position and the non-P position based on a P switching request signal (P lock switching request signal, P release switching request signal) from the HV-ECU 104 for example, the P-ECU 106 controls the drive of the parking lock device 16 to actuate or release the parking lock. Namely, the P-ECU 106 functions as a parking lock control device for performing a switch between the lock state (P lock state) and the non-lock state (non P lock state) of the parking lock device 16 based on the P switching request signal (P lock switching request signal, P release switching request signal) as the predetermined request signal. The P-ECU 106 determines whether the shift position of the transmission 18 is the P position or the non-P position based on a P position signal indicative of the actuation state of the parking lock from the parking lock device 16 and outputs the result of the determination as a P lock state signal to the PM-ECU 102, the HV-ECU 104, etc.

Through communication with the sensors, the HV-ECU 104, etc., the skid control ECU 108 executes braking controls such as regenerative cooperative control, ABS (antilock brake system) action control, and brake assist control for example. The skid control ECU 108 converts a wheel speed pulse signal $N_W$ output from the wheel speed sensor 48 into a vehicle speed signal V1 representing the vehicle speed V and transmits the vehicle speed signal V1 to the other ECUs by way of a multiplex communication line 60 for in-vehicle multiplex communication such as CAN (Controller Area Network) communication or LIN (Local Interconnect Network)-communication. The skid control ECU 108 converts the wheel speed pulse signal $N_W$ into a vehicle speed pulse signal and outputs the vehicle speed pulse signal via a direct connection line 62 to the meter ECU 110. The direct connection line 62 is a communication line such as a metal wire that is configured by directly one-to-one connecting a wiring harness for example for each of ECUs and sensors which are communications partners when executing various controls.

The meter ECU 110 determines a meter indication vehicle speed signal V2 based on the vehicle speed pulse signal output from the skid control ECU 108 and outputs a vehicle speed indication control command signal for indicating a current vehicle speed V, to actuate the speedometer 52 to indicate the current vehicle speed V. The meter ECU 110 issues a shift position indication control command signal for indicating the state of the shift position based on the shift position indication signal output from the HV-ECU 104, to indicate the state of the current shift position on the shift position indicator 54.

Figure 2:
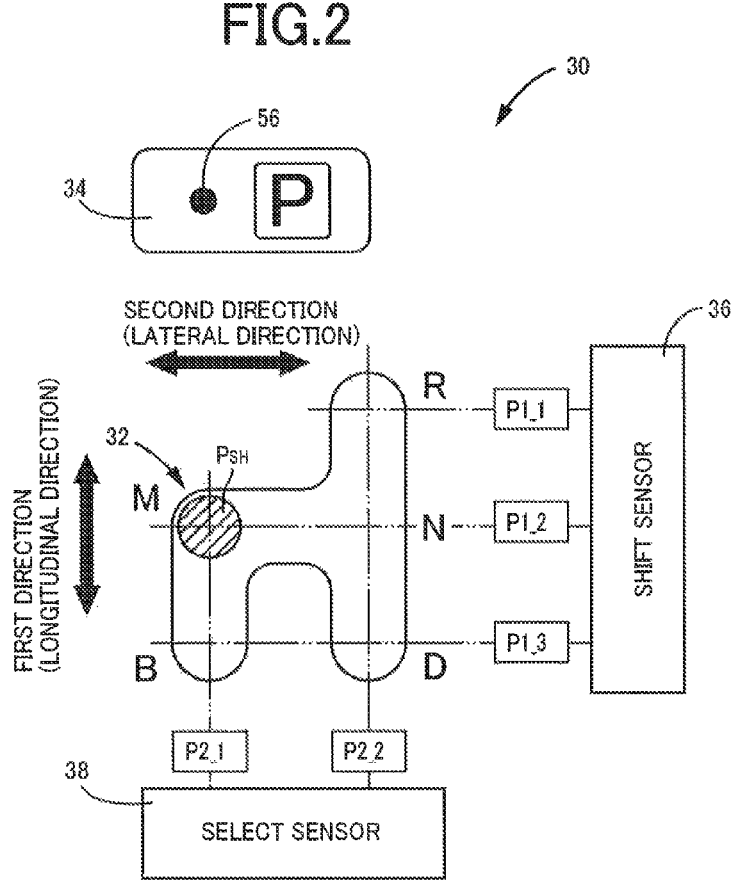
FIG. 2 is a diagram depicting an example of the shift operation device as a switching device for manually switching a plurality of different shift positions.

FIG. 2 is a diagram depicting an example of the shift operation device 30 as a switching device (operation device) for manually switching a plurality of different shift positions in the transmission 18. The shift operation device 30 includes the shift lever 32 disposed in the vicinity of the driver's seat as a momentary operation element operated to a plurality of operation positions $P_{SH}$, that is, as an automatic return operation element that automatically returns to its original position (initial position) when releasing an operation force. The shift operation device 30 of this embodiment includes, as a separate switch disposed in the vicinity of the shift lever 32, the P switch 34 as a momentary operation element for parking lock of the shift position of the transmission 18 as the parking position (P position).

The shift lever 32 is operated to three operation positions $P_{SH}$, that is, an R operation position, an N operation position, and a D operation position, arranged in the front-to-rear direction of the vehicle or in the vertical direction, that is, in the longitudinal direction as depicted in FIG. 2 and to an M operation position and a B operation position arranged parallel thereto and outputs a shift lever position signal corresponding to the operation position $P_{SH}$ to the HV-ECU 104. The shift lever 32 is longitudinally operable among the R operation position, the N operation position, and the D operation position; longitudinally operable between the M operation position and the B operation position; and operable between the N operation position and the B operation position in a transverse direction of the vehicle that is orthogonal to the longitudinal direction thereof.

The P switch 34 is the momentary push-button switch for example and outputs a P switch signal to the HV-ECU 104 for each of press operations by the user. When the P switch 34 is pressed with the shift position of the transmission 18 being at a non-P position for example, the P-ECU 106 changes the shift position to the P position based on a P lock switching request signal from the HV-ECU 104 if a predetermined condition is satisfied such as being not more than a P lock permission vehicle speed Vp previously set for determining that the vehicle speed V is at a vehicle stop (or in a substantially stop state). This P position is a parking position where the power transmitting path is cut off in the transmission 18 and where a parking lock is executed that mechanically locks the rotation of the driving wheels 14 by the parking lock device 16. The P switch 34 incorporates the P position indicator lamp 56 that is turned on by the HV-ECU 104 if the P lock state signal from the P-ECU 106 is indicative of being at P position.

The M operation position of the shift operation device 30 is the initial position (home position) of the shift lever 32. Even though the shift lever 32 is operated to an operation position $P_{SH}$ (R, N, D, or B operation position) other than the M operation position, the shift lever 32 returns to the M operation position by a mechanical mechanism such as a spring if the driver releases the shift lever 32, that is, if no external force acts on the shift lever 32. When the shift operation device 30 is shift-operated to each shift position $P_{SH}$, the HV-ECU 104 performs switching to a shift position corresponding to the shifted operation position $P_{SH}$ based on a shift lever position signal corresponding to the operation position $P_{SH}$ and the shift position indicator 54 indicates the current operation position $P_{SH}$, that is, the shift position state of the transmission 18.

Describing the shift positions, the R position selected by operating the shift lever 32 to the R operation position is a backward running position where a driving force moving the vehicle 10 backward is transmitted to the driving wheels 14. The neutral position (N position) selected by operating the shift lever 32 to the N operation position is a neutral position for providing a neural state where the power transmission path is cut off in the transmission 18. The D position selected by operating the shift lever 32 to the D operation position is a forward running position where a driving force moving the vehicle 10 forward is transmitted to the driving wheels 14. For example, if, when the shift position is the P position, the HV-ECU 104 determines based on the shift lever position signal that a shift operation is made to a predetermined operation position $P_{SH}$ (specifically, the R operation position, the N operation position, or the D operation position) releasing the movement prevention (parking lock) of the vehicle 10, the HV-ECU 104 outputs a P release switching request signal for releasing the parking lock to the P-ECU 106 as long as a predetermined condition is satisfied such as being in brake-on state $B_{ON}$. In response to the P release switching request signal from the HV-ECU 104, the P-ECU 106 outputs a P switching control command signal for releasing the parking lock to the parking lock device 16 to release the parking lock. The HV-ECU 104 performs switching to a shift position corresponding to the shifted operation position $P_{SH}$.

The B position selected by operating the shift lever 32 to the B operation position is a decelerated forward running position (engine brake range) reducing the rotation of the driving wheels 14 by exerting the engine braking effect through the regenerative braking that generates a regenerative torque in the electric motor M for example at the D position. Therefore, even though the shift lever 32 is operated to B operation position when the current shift position is a shift position other than the D position, the HV-ECU 104 invalidates the shift operation and, only when the current shift position is the D position, validates the shift operation to the B operation position. For example, even though the driver performs operating to the B operation position when the current shift position is the P position, the shift position remains at the P position.

Since in the shift operation device 30 of this embodiment the shift lever 32 returns to the M operation position if the external force acting on the shift lever 32 is cancelled, the driver cannot recognize the shift position in selection by merely viewing the operation position $P_{SH}$ of the shift lever 32. Hence, the shift position indicator 54 is disposed at a position easily visible by the driver and the shift position in selection is indicated on the shift position indicator 54.

This embodiment employs the so-called shift-by-wire (SBW) system and the shift operation device 30 is two-dimensionally shift-operated in a first direction P1 that is the longitudinal direction and in a second direction P2 that is the transverse direction intersecting (at right angles in FIG. 2) with the direction P1. Accordingly, to output the operation position $P_{SH}$ in the form of detection signals from the position sensors to the electronic control device 100, the shift operation device 30 is provided with the shift sensor 36 as a first-direction detecting portion that detects a shift operation in the first direction P1 and the select sensor 38 as a second-direction detecting portion that detects a shift operation in the second direction P2. Both the shift sensor 36 and the select sensor 38 output to the electronic control device 100 a voltage as a detection signal (shift lever position signal) corresponding to the operation position $P_{SH}$ so that the electronic control device 100 recognizes (determines) the operation position $P_{SH}$ based on the detection signal voltage. This means that the first-direction detecting portion (shift sensor 36) and the second-direction detecting portion (select sensor 38) make up as a whole an operation position detecting portion that detects the operation position $P_{SH}$ of the shift operation device 30.

Giving an example of the recognition of the operation position $P_{SH}$, a detection signal voltage $V_{SF}$ of the shift sensor 36 is of voltage levels (for example, voltages in a low range, a mid range, and a high range) corresponding to positions of a first-direction first-position P1_1 indicative of the R operation position, a first-direction second-position P1_2 indicative of the M operation position or the N operation position, and a first-direction third-position P1_3 indicative of the B operation position or the D operation position. A detection signal voltage $V_{SL}$ of the select sensor 38 is of voltage levels (for example, voltages in a low range and a high range) corresponding to positions of a second-direction first-position P2_1 indicative of the M operation position or the B operation position and a second-direction second-position P2_2 indicative of the R operation position, the N operation position, or the D operation position. The HV-ECU 104 detects the detection signal voltages $V_{SF}$ and $V_{SL}$ varying in this manner and recognizes the operation position $P_{SH}$ (the R, N, D, M or B operation position) by the combination of the voltage levels.

Figure 3:
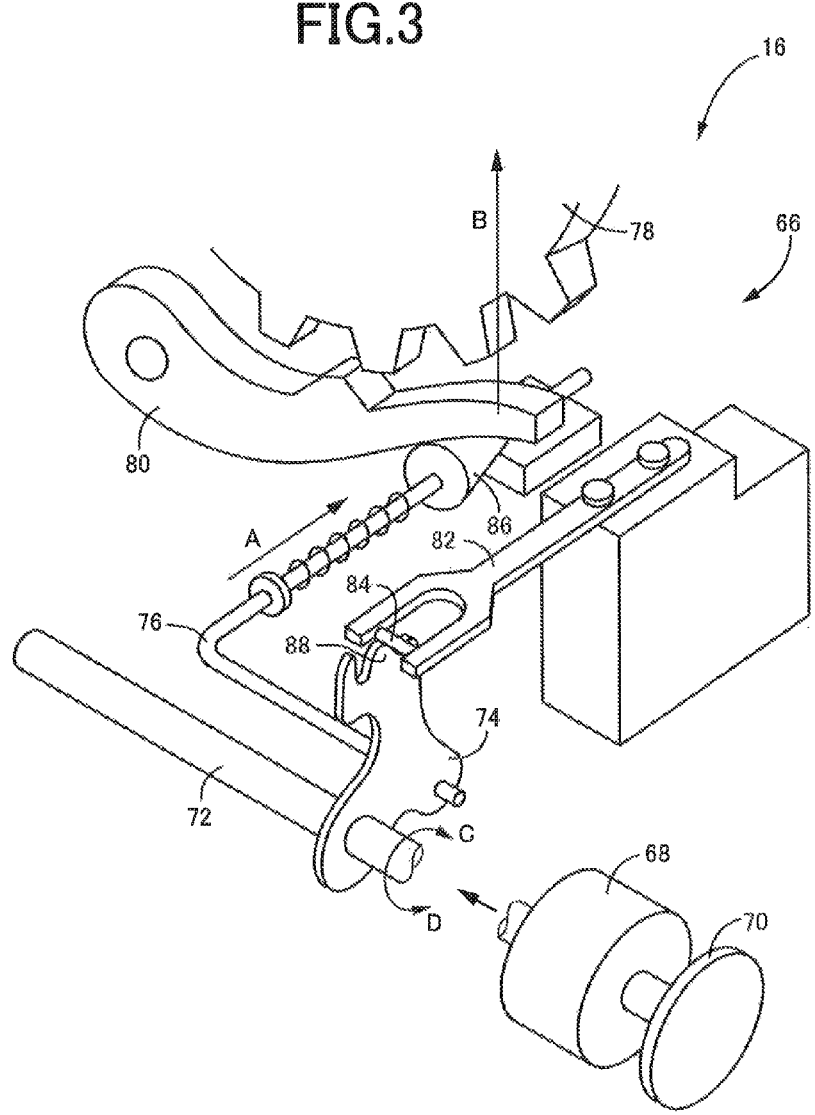
FIG. 3 is a diagram explaining a configuration of the parking lock device that mechanically locks the rotation of the driving wheels.

FIG. 3 is a diagram explaining a configuration of the parking lock device 16 that mechanically locks the rotation of the driving wheels 14. Referring to FIG. 3, the parking lock device 16 includes a P lock mechanism 66, a P lock drive motor 68, and an encoder 70 and is an actuator that works to prevent the movement of the vehicle 10 based on a control signal from the electronic control device 100.

The P lock drive motor 68 is comprised of for example an SR motor and drives the P lock mechanism 66 by the shift-by-wire system in response to a command from the P-ECU 106. The encoder 70 rotates integrally with the P lock drive motor 68 for example and feeds to the P-ECU 106 a pulse signal for acquiring a count (encoder count) corresponding to the amount of movement (the amount of rotation) of the P lock drive motor 68.

The P lock mechanism 66 includes: a shaft 72 rotationally driven by the P lock drive motor 68; a detent plate 74 functioning as a P lock positioning member for switching between a P lock position corresponding to the P position and non P lock positions corresponding to the shift positions (non-P positions) other than the P position by rotating in accompaniment with the rotation of the shaft 72; a rod 76 acting in accompaniment with the rotation of the detent plate 74; a parking gear 78 (see FIG. 1) fixed coaxially to the output gear 22 of the transmission 18 for example and rotating in conjunction with the driving wheels 14; a parking lock pawl 80 for locking the rotation of the parking gear 78; a detent spring 82 that limits the rotation of the detent plate 74 to fix the shift position; and a roller 84.

FIG. 3 depicts a state at a non parking lock position. When the shaft 72 is rotated in a direction indicated by an arrow C from this state, the rod 76 is pushed in a direction of an arrow A so that the parking lock pawl 80 is pushed up in a direction of an arrow B. Accompanying the rotation of the detent plate 74, the roller 84 of the detent spring 82 at the non parking lock position climbs over a crest 88 to reach a parking lock position. When the detent plate 74 rotates till the roller 84 arrives at the parking lock position, the parking lock pawl 80 is pushed up to a position engaged with the parking gear 78. As a result, the rotation of the parking gear 78 is mechanically locked so that the shift position is switched to the P position.

At this time, as described above, in the vehicle 10 of this embodiment, the "auto-P action" is executed by the "press operation of the vehicle power switch 40" when the vehicle speed V is a predetermined vehicle speed V' or less at the non-P position and in the IG-ON state. On the other hand, in addition to the mode of executing the "emergency IG-OFF action" by "long-press operation of the vehicle power switch 40" during the vehicle running, the "emergency IG-OFF action" is executed also by the "plural-times of successive short-press operations of the vehicle power switch 40" during the vehicle running. By the way, the user may execute the "plural-times of successive short-press operations of the vehicle power switch 40" with the aim of (in expectation of) the "auto-P action", for example, in anticipation of falling to the predetermined vehicle speed V' or below during the deceleration from the vehicle speed V exceeding the predetermined vehicle speed V'. In such an event, if at least one operation of the "plural-times of successive short-press operations of the vehicle power switch 40" is executed at the predetermined vehicle speed V' or less, the following phenomena may possibly occur.

First, referring to FIG. 1, a flow of a series of processes of the "auto-P action" will briefly described by way of example in (1) to (10) below.

(1) The PM-ECU 102 receives a power switch signal $SW_{ON}$ accompanying an operation of the vehicle power switch 40.
(2) The PM-ECU 102 determines whether the power switch signal $SW_{ON}$ is valid based on whether the vehicle speed V is the predetermined vehicle speed V' or less.
(3) If the vehicle speed V is the predetermined vehicle speed V' or less, the PM-ECU 102 outputs an auto-P request signal via the multiplex communication line 60 to the HV-ECU 104.
(4) The HV-ECU 104 determines whether to output a P lock switching request signal based on whether the vehicle speed V is the predetermined vehicle speed V' or less.
(5) If the vehicle speed V is the predetermined vehicle speed V' or less, the HV-ECU 104 outputs the P lock switching request signal to the P-ECU 106.
(6) The P-ECU 106 controls the drive of the parking lock device 16 to actuate the parking lock, that is, to switch the shift position to the P position.
(7) If the P-ECU 106 determines that the shift position is the P position, i.e. that the actuation of the parking lock is completed, the P-ECU 106 outputs the result of the determination as a P lock state signal to the HV-ECU 104.
(8) The HV-ECU 104 determines whether to issue an auto-P completion signal based on whether the vehicle speed V is the predetermined vehicle speed V' or less.
(9) If the vehicle speed V is the predetermined vehicle speed V' or less, the HV-ECU 104 outputs the auto-P completion signal via the multiplex communication line 60 to the PM-ECU 102.
(10) The PM-ECU 102 switches the power supply state of the vehicle 10 to ALL-OFF state based on the auto-P completion signal.

In the flow of a series of processes of the "auto-P action" described in (1) to (10), the auto-P request signal of (3) and the auto-P completion signal of (9) for example are transmitted and received by way of the multiplex communication line 60. The signal transmission and reception via the multiplex communication line 60 are disabled when the power supply state of the vehicle 10 is IG-OFF state.

In consequence, in the event that at the predetermined vehicle speed V' or less at least one operation is performed of the "plural-times of successive short-press operations of the vehicle power switch 40" satisfying the execution condition for the "emergency IG-OFF action", for example an auto-P request signal is transmitted from the PM-ECU 102 via the multiplex communication line 60 toward the HV-ECU 104, but, if, before the HV-ECU 104 receives the auto-P request signal or before the parking lock device 16 is actuated by the P-ECU 106, the "emergency IG-OFF action" is executed so that the power supply state of the vehicle 10 goes to the ACC-ON state, then the shift position cannot be switched to the P position, as a result of which the vehicle 10 is put at the N position in the ACC-ON state (phenomenon 1). On the other hand, similarly, in the event that at the predetermined vehicle speed V' or less at least one operation is performed of the "plural-times of successive short-press operations of the vehicle power switch 40" satisfying the execution condition for the "emergency IG-OFF action", for example the HV-ECU 104 receives an auto-P request signal transmitted from the PM-ECU 102 via the multiplex communication line 60 and, based on a P lock switching request signal output from the HV-ECU 104, the P-ECU 106 actuates the parking lock device 16 to switch the shift position to the P position, but, if, before an auto-P completion signal is transmitted from the HV-ECU 104 via the multiplex communication line 60 toward the PM-ECU 102 or before the PM-ECU 102 receives the auto-P completion signal regardless of the transmission of the auto-P completion signal, the "emergency IG-OFF action" is executed so that the power supply state of the vehicle 10 goes to the ACC-ON state, then the PM-ECU 102 cannot receive the auto-P completion signal, as a result of which the vehicle 10 is put at the P position in the ACC-ON state (phenomenon 2). In this manner, even though the "press operation of the vehicle power switch 40" is performed at the predetermined vehicle speed V' or less, there occur phenomena of inexecution of the "auto-P action". The phenomena differ depending on the time of execution of the "emergency IG-OFF action". Thus, the user's operational intention may not be precisely reflected.

In both the phenomena 1 and 2, for example when the user's operation of the vehicle power switch 40 is performed in expectation of the "auto-P action", the user may misunderstand that the "auto-P action" has been executed and may leave the vehicle 10 with the ACC-ON state unchanged, resulting in a dead battery. In the phenomenon 2, in particular, switching to the non-P position (release of the P lock state) may be infeasible if the dead battery occurs. In the phenomenon 1, in particular, the user may leave the vehicle 10 with the N position unchanged. In this manner, the user's operational intention may not be precisely reflected.

To ensure a secure execution of switching to the P position (parking position) for example, the electronic control device 100 of this embodiment executes the switching to the P position prior to the "emergency IG-OFF action", that is, prior to the switching to the ACC-ON state in the "emergency IG-OFF action" if, on the condition that the vehicle speed is the predetermined vehicle speed V' or less, at least one operation is performed of the "plural-times of successive short-press operations of the vehicle power switch 40" satisfying the execution condition for the "emergency IG-OFF action". Specifically, in the event that, on the condition that the vehicle speed is the predetermined vehicle speed V' or less, at least one operation is performed of the "plural-times of successive short-press operations of the vehicle power switch 40" for example, the electronic control device 100 executes the switching to the ACC-ON state after the elapse of a predetermined switching time $T_P$ that is previously experimentally found and set (stored) as a time from the output of the auto-P request signal up to the execution of switching to the P position by the parking lock device 16. In other words, provided that, on the condition that the vehicle speed is the predetermined vehicle speed V' or less, at least one operation is performed of the "plural-times of successive short-press operations of the vehicle power switch 40" for example, the electronic control device 100 delays the execution of the "emergency IG-OFF action" by the predetermined switching time $T_P$. This predetermined switching time $T_P$ is an execution standby time (for example, a time of the order of 1 sec) for the "emergency IG-OFF action" that is previously found as a time required to securely switch the shift position to the P position by actuating the parking lock device 16 by the P-ECU 106 after the secure reception by the HV-ECU 104 of the auto-P request signal output from the PM-ECU 102 via the multiplex communication line 60.

To properly prevent the battery from dying due to the ACC-ON state left as it is for example, the electronic control device 100 further switches the power supply state of the vehicle 10 from the ACC-ON state to the ALL-OFF state after the completion of the switching to the P position in the event that, on the condition that the vehicle speed is the predetermined vehicle speed V' or less, at least one operation is performed of the "plural-times of successive short-press operations of the vehicle power switch 40" satisfying the execution condition for the "emergency IG-OFF action".

Figure 4:
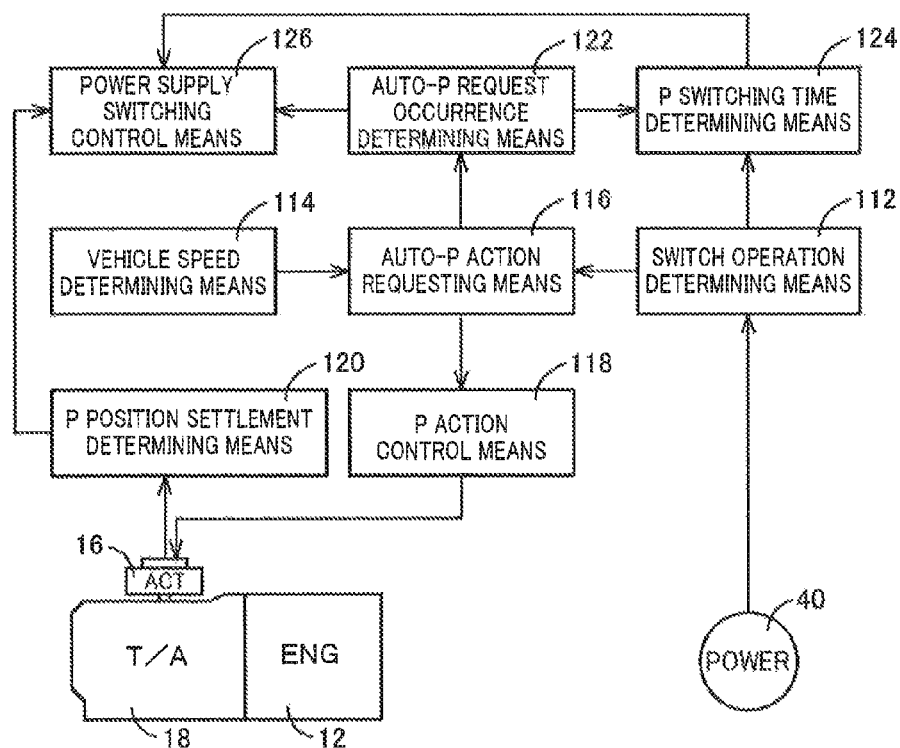
FIG. 4 is a function block diagram explaining a principal part of the control function of the electronic control device.

More specifically, FIG. 4 is a function block diagram explaining a principal part of the control function provided by the electronic control device 100. In FIG. 4, a switch operation determining portion, that is, a switch operation determining means 112 determines for example whether an operation of the vehicle power switch 40 is performed by the user. For example, the switch operation determining means 112 determines whether an operation of the vehicle power switch 40 is performed, based on whether the power switch signal $SW_{ON}$ rises. If the switch operation determining means 112 determines for example that the operation of the vehicle power switch 40 is performed, the switch operation determining means 112 determines whether the detection interval of the rise of the power switch signal $SW_{ON}$, that is, the interval between the last operation and the current operation of the vehicle power switch 40 is the predetermined time $T_{SW}$ or less. If the switch operation determining means 112 determines for example that the detection interval of the power switch signal $SW_{ON}$ is the predetermined time $T_{SW}$ or less, the switch operation determining means 112 functions as a counting means that adds "1" to a last successive switch operation count (a value of the successive switch operation counter) N to obtain a new successive switch operation count N (=N+1). On the other hand, if determining for example that the detection interval of the power switch signal $SW_{ON}$ exceeds the predetermined time $T_{SW}$, the switch operation determining means 112 sets the successive switch operation count N to the initial value (N=1). The switch operation determining means 112 further determines for example whether the successive switch operation count N is a predetermined number of times $N_{SW}$ or more, that is, whether there occur the "plural-times of successive short-press operations of the vehicle power switch 40" satisfying the execution condition for the "emergency IG-OFF action". In other words, by determining whether the successive switch operation count N is the predetermined number of times $N_{SW}$ or more for example, the switch operation determining means 112 functions as an emergency stop process determining means (or emergency IG-OFF action determining means) that determines whether to execute the "emergency IG-OFF action".

A vehicle speed determining portion, that is, a vehicle speed determining means 114 determines for example whether the vehicle speed V is the predetermined vehicle speed V' or less.

An auto-P action requesting portion, that is, an auto-P action requesting means 116 issues the auto-P request signal if for example it is determined by the vehicle speed determining means 114 that the vehicle speed V is the predetermined vehicle speed V' or less when the switch operation determining means 112 determines that the operation of the vehicle power switch 40 has been performed.

A P action control portion, that is, a P action control means 118 issues a P lock switching request signal if for example the auto-P request signal is output from the auto-P action requesting means 116 and, based on the P lock switching request signal, controls the drive of the parking lock device 16 to actuate the parking lock, that is, to switch the shift position to the P position.

A P position settlement determining portion, that is, a P position settlement determining means 120 determines for example whether the P position (P lock state) is settled by the actuation of the parking lock device 16, based on a P position signal indicative of the actuation state of the parking lock from the parking lock device 16. In other words, the P position settlement determining means 120 determines whether the shift position of the transmission 18 is the P position based on the P position signal.

An auto-P request occurrence determining portion, that is, an auto-P request occurrence determining means 122 determines for example whether there occurs an output of the auto-P request signal from the auto-P action requesting means 116.

A P switching time determining portion, that is, a P switching time determining means 124 counts up a timer count (a value of a timer counter) T from the output of the auto-P request signal from the auto-P action requesting means 116 if it is determined by the switch operation determining means 112 that the successive switch operation count N is the predetermined number of times $N_{SW}$ or more and if it is determined by the auto-P request occurrence determining means 122 that the output of the auto-P request signal occurs. The P switching time determining means 124 determines for example whether the timer count T reaches the predetermined switching time $T_P$ or more.

A power supply switching control portion, that is, a power supply switching control means 126 switches the power supply state of the vehicle 10 to the ACC-ON state for the "emergency IG-OFF action" if for example it is determined by the auto-P request occurrence determining means 122 that there is no output of the auto-P request signal when the switch operation determining means 112 determines that the successive switch operation count N is the predetermined number of times $N_{SW}$ or more or if it is determined by the P switching time determining means 124 that the timer count T reaches the predetermined switching time $T_P$ or more. The power supply switching control means 126 switches the power supply state of the vehicle 10 from the ACC-ON state to the ALL-OFF state if it is determined by the P position settlement determining means 120 that the shift position is the P position, after the execution of switching to the ACC-ON state for example. On the other hand, if it is determined by the P position settlement determining means 120 that the shift position is not the P position, after the execution of switching to the ACC-ON state for example, the power supply switching control means 126 continues (keeps) the ACC-ON state for the "emergency IG-OFF action" unchanged.

Figure 5:
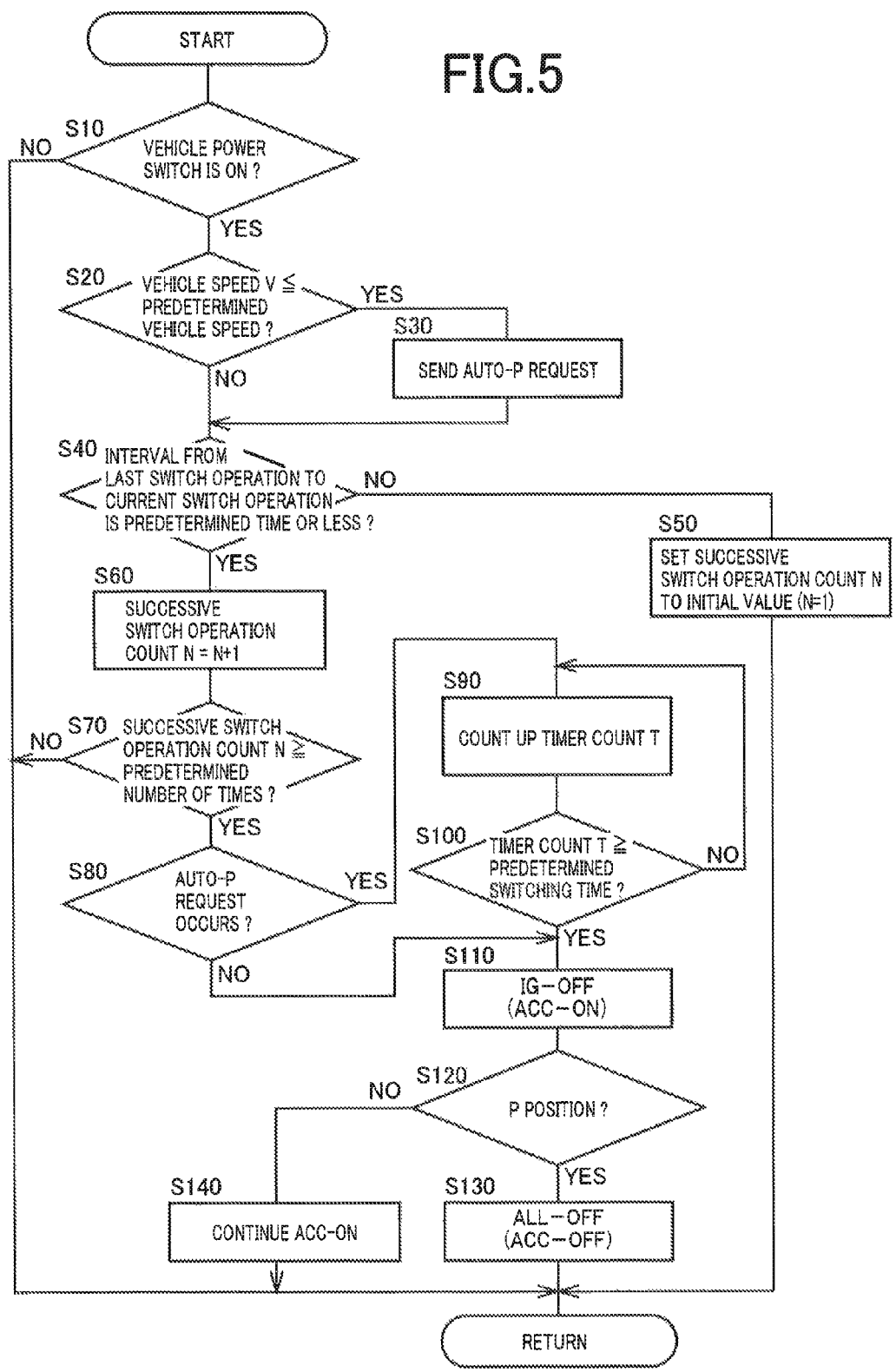
FIG. 5 is a flowchart explaining a principal part of control actions of the electronic control device, that is, control actions for accurately reflecting the user's operational intention in the electrical switching control to the P position.
Figure 6:
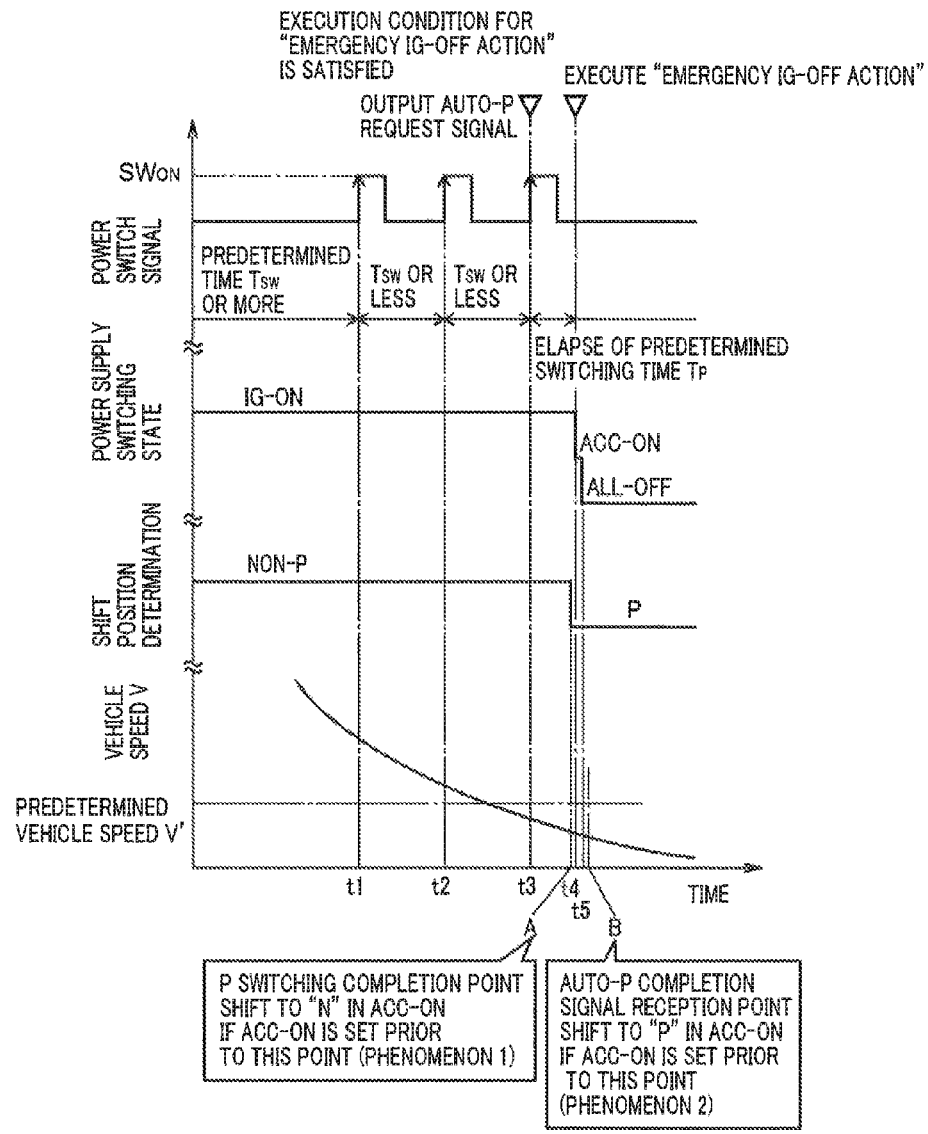
FIG. 6 is a timing chart corresponding to the flowchart of FIG. 5.

FIG. 5 is a flowchart explaining a principal part of control actions of the electronic control device 100, that is, control actions for accurately reflecting the user's operational intention in the electrical switching control to the P position, the flow being iteratively executed in an extremely short cycle time of the order of several msec to several tens of msec for example. FIG. 6 is a timing chart corresponding to the control actions depicted in the flowchart of FIG. 5.

In FIG. 5, first, at step (hereinafter, "step" will be omitted) S10 corresponding to the switch operation determining means 112, determination is made of whether the vehicle power switch 40 is operated, based on whether the power switch signal $SW_{ON}$ rises for example. If the determination at S10 is negative, this routine is terminated, while, if affirmative, determination is made for example of whether the vehicle speed V is the predetermined vehicle speed V' or less at S20 corresponding to the vehicle speed determining means 114 (t1, t2, and t3 of FIG. 6). If the determination at S20 is affirmative, the auto-P request signal is issued at S30 corresponding to the auto-P action requesting means 116 (t3 of FIG. 6). On the other hand, if the determination at S20 is negative, or, subsequent to S30, it is determined at S40 corresponding to the switch operation determining means 112 whether for example the detection interval of the rise of the power switch signal $SW_{ON}$, that is, the interval between the last operation and the current operation of the vehicle power switch 40 is the predetermined time $T_{SW}$ or less (t1, t2, and t3 of FIG. 6). If the determination at S40 is negative, for example the successive switch operation count N is set to the initial value (N=1) at S50 also corresponding to the switch operation determining means 112, to terminate the routine (t1 of FIG. 6). On the other hand, if the determination at S40 is affirmative, for example "1" is added to the last successive switch operation count N to acquire a new successive switch operation count N (=N+1) at S60 also corresponding to the switch operation determining means 112 (t2 and t3 of FIG. 6). Next, at S70 corresponding to also corresponding to the switch operation determining means 112, determination is made of for example whether the successive switch operation count N is the predetermined number of times $N_{SW}$ (3 times for example) or more. If the determination at S70 is negative, the routine is terminated, while, if affirmative, determination is made of whether the output of the auto-P request signal occurs for example at S80 corresponding to the auto-P request occurrence determining means 122 (t3 of FIG. 6).

If the determination at S80 is affirmative, the timer count T is counted up from the output of the auto-P request signal at S30 for example at S90 corresponding to the P switching time determining means 124. Next, at S100 also corresponding to the P switching time determining means 124, determination is made of for example whether the timer count T reaches the predetermined switching time $T_P$ or more. If the determination at S100 is negative, the control returns to S90. Then, if the determination at S80 is negative or if the determination at S100 is affirmative (t4 of FIG. 6), the power supply state of the vehicle 10 is switched to the ACC-ON state for the "emergency IG-OFF action" for example at S110 corresponding to the power supply switching control means 126. Next, at S120 corresponding to the P position settlement determining means 120, determination is made of whether the P position (P lock state) is settled, that is, whether the shift position is the P position, based on the P position signal indicative of the actuation state of the parking lock from the parking lock device 16 for example. If the determination at S120 is affirmative, for example the power supply state of the vehicle 10 is switched from the ACC-ON state to the ALL-OFF state at S130 corresponding to the power supply switching control means 126 (t5 of FIG. 6). On the other hand, if the determination at S120 is negative, the ACC-ON state for the "emergency IG-OFF action" is continued (kept) as it is, at S140 also corresponding to the power supply switching control means 126.

In FIG. 6, in the case where, at the predetermined vehicle speed V' or less, at least one is performed of the plural times of successive inputs of the power switch signal $SW_{ON}$ satisfying the execution condition for the "emergency IG-OFF action", if the power supply state of the vehicle 10 goes to the ACC-ON state as a result of the execution of the "emergency IG-OFF action" prior to the time (A of FIG. 6) of the completion of switching to the P position, then the shift position cannot switch to the P position so that the vehicle 10 is at the N position in the ACC-ON state (which deals with the phenomenon 1). In the same case as the above, if the power supply state of the vehicle 10 changes to the ACC-ON state as a result of the execution of the "emergency IG-OFF action" prior to the time (B of FIG. 6) of the reception of the auto-P completion signal, then the power supply state cannot switch to the ALL-OFF state though the shift position can switch to the P position so that the vehicle 10 is at the P position in the ACC-ON state (which deals with the phenomenon 2). Against these phenomena, in the case where, at the predetermined vehicle speed V' or less, at least one is performed of the plural times of successive inputs of the power switch signal $SW_{ON}$ satisfying the execution condition for the "emergency IG-OFF action", the power supply state of the vehicle 10 goes to the ACC-ON state after the elapse of the predetermined switching time $T_P$, so that the shift position is securely switched to the P position. In addition, if the vehicle 10 goes to the P position in the ACC-ON state, the power supply state of the vehicle 10 is switched from the ACC-ON state to the ALL-OFF state, so that the vehicle 10 can be securely at the P position in the ALL-OFF state.

As described above, according to this embodiment, in the case where on the condition that the vehicle speed is the predetermined vehicle speed V' or less, at least one operation is performed of the "plural times of successive short-press operations of the vehicle power switch 40" satisfying the execution condition for the "emergency IG-OFF action", the switching to the P position is executed prior to the "emergency IG-OFF action", that is, prior to the switching to the ACC-ON state in the "emergency IG-OFF action". In consequence, the switching to the P position is securely executed against the existence of the risk that, when the switching to the ACC-ON state is compulsorily performed by the execution of the "emergency IG-OFF action" for example, the switching to the P position may not be executed due to the ACC-ON state regardless of the execution at the predetermined vehicle speed V' or less of at least one operation of the "plural times of successive short-press operations of the vehicle power switch 40". In other words, when for example the user performs the "plural times of successive short-press operations of the vehicle power switch 40" at or near the predetermined vehicle speed V' in expectation of the "auto-P action", the P lock is executed in accordance with the user's intention so that the vehicle 10 can be fixed. Thus, the user's operational intention can be precisely reflected on the electrical switching control to the P position for the P lock.

According to this embodiment, in the case where on the condition that the vehicle speed is the predetermined vehicle speed V' or less, at least one operation is performed of the "plural times of successive short-press operations of the vehicle power switch 40", the power supply state of the vehicle 10 is further switched from the ACC-ON state to the ALL-OFF state after the completion of the switching to the P position, whereby the battery can be properly prevented from dying due to the ACC-ON state left as it is for example. Namely, the switching to the ALL-OFF state is securely executed after the completion of the switching to the P position, against the existence of the risk that, though the switching to the P position is securely performed as a result of the execution of the switching to the P position prior to the switching to the ACC-ON state, the switching to the ALL-OFF state may not be performed after the completion of the switching to the P position due to the execution of the compulsory switching to the ACC-ON state.

According to this embodiment, in the case where on the condition that the vehicle speed is the predetermined vehicle speed V' or less, at least one operation is performed of the "plural times of successive short-press operations of the vehicle power switch 40", the switching to the ACC-ON state is executed after the elapse of the predetermined switching time $T_P$, with the result that, against the existence of the risk that the interchange of the predetermined request signal such as the auto-P request signal or the actuation itself of the parking lock device 16 may not be executed due to the execution of the compulsory switching to the ACC-ON state, the compulsory switching to the ACC-ON state is delayed by at least the predetermined switching time $T_P$ required for the interchange of the predetermined request signal and the actuation itself of the parking lock device 16 so that the switching to the P position becomes feasible.

According to this embodiment, the operation for switching the power supply state of the vehicle 10 is a press operation of the vehicle power switch 40 and the "plural times of successive short-press operations of the vehicle power switch 40" are plural times of successive press operations where each of the operation interval between the successive press operations is within the predetermined time $T_{SW}$ and where the number of times of the press operations is the predetermined number of times $N_{SW}$ or more, so that the user's operational intention can be precisely reflected.

Another embodiment of the present invention will then be described. In the following description, portions common to the embodiments are designated by the same reference numerals and will not be described again.

Embodiment 2

In the above embodiment, the first state of the vehicle state is the power on state (IG-ON state) of the power supply state of the vehicle 10; the second state of the vehicle state is the partial power on state (ACC-ON state and IG-OFF state) of the power supply state of the vehicle 10; and the third state of the vehicle state is the power off state (ALL-OFF state and IG/ACC-OFF state) of the power supply state of the vehicle 10. The power on state (IG-ON state) is for example a state where the vehicle running can be controlled by a hybrid control command signal associated with the vehicle running and a running enabled state (READY-ON state) where the vehicle 10 can start and run if the accelerator is stepped on. Unless specifically differentiated, however, the power on state (IG-ON state) further includes a state where other functions are controllable than functions for controlling the vehicle running based on the hybrid control command signal and where the engine 12 does not start up and the electric motor M does not work, that is, where the vehicle 10 cannot start and run even if the accelerator is stepped on. In this case, the second state is a vehicle state for turning off the functions associated with the vehicle running and turning on the functions not associated with the vehicle running and, for example, may include a running disabled state (READY-OFF state) not allowing the running enabled state (READY-ON state) in the power on state (IG-ON state), that is, not allowing starting and running of the vehicle 10 regardless of the accelerator on.

Namely, in this embodiment, a first state of the vehicle state is for example a running power on state (IG-ON state+READY-ON state) for the vehicle running in the power supply state of the vehicle 10; a second state of the vehicle state is for example a running power off state (IG-ON state+READY-OFF state, or ACC-ON state) in the power supply state of the vehicle 10, for disabling the vehicle running and for turning on the power source not involved in the vehicle running; and a third state of the vehicle state is for example a power off state (ALL-OFF state) in the power supply state of the vehicle 10, for turning off both the power source involved in the vehicle running and the power source not involved in the vehicle running. In the ordinary engine vehicle for example other than the hybrid vehicle, the switching from the running power on state (IG-ON state+READY-ON state) to the running power off state (IG-ON state+READY-OFF state) means controlling only the engine 12 for example from the operation state (working state) to the stop state.

Figure 7:
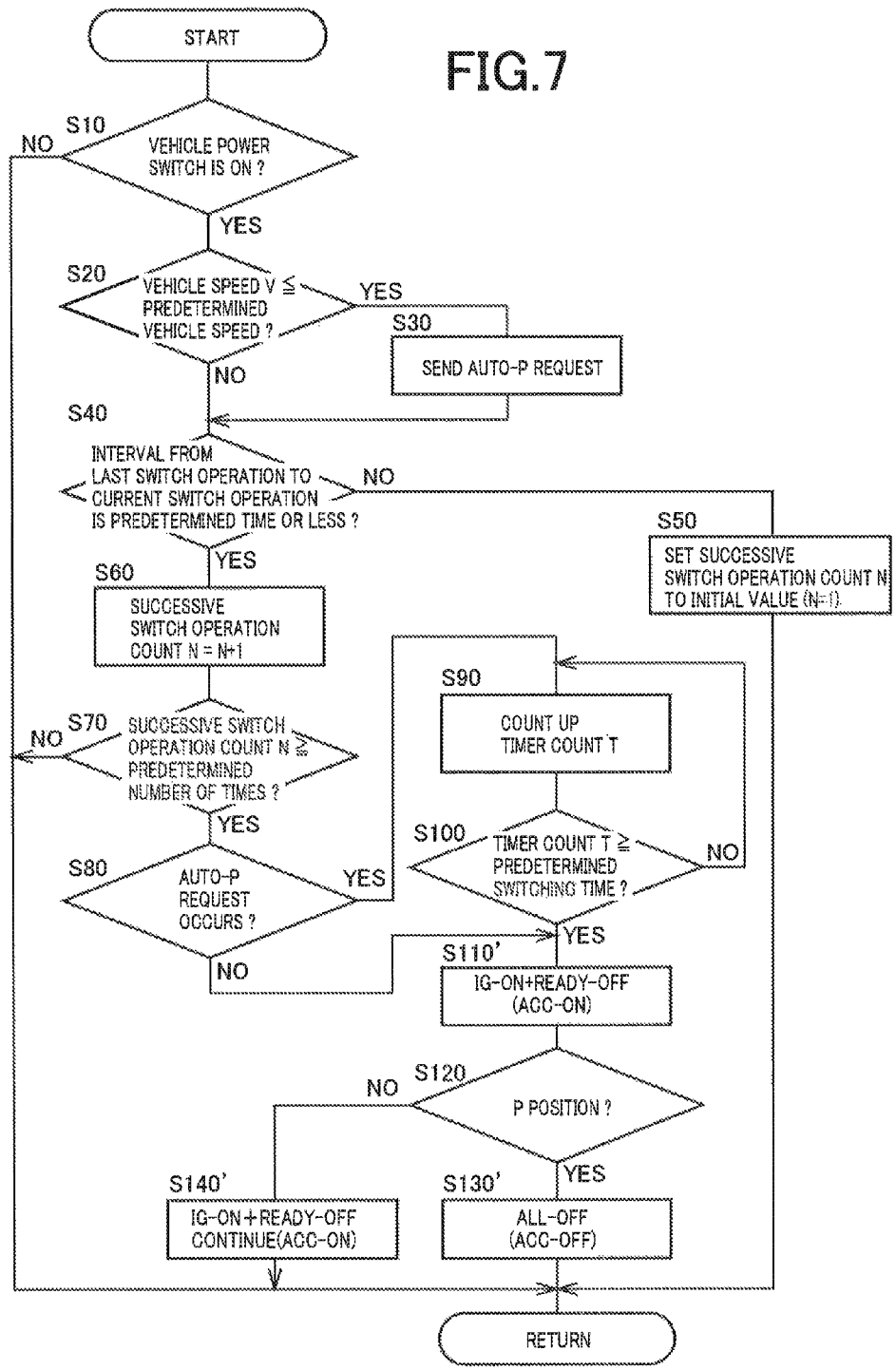
FIG. 7 is a flowchart explaining a principal part of control actions of the electronic control device, that is, control actions for accurately reflecting the user's operational intention in the electrical switching control to the P position, FIG. 7 being another embodiment corresponds to the flowchart of FIG. 5.

FIG. 7 is a flowchart explaining a principal part of control actions of the electronic control device 100, that is, control actions for accurately reflecting the user's operational intention in the electrical switching control to the P position, the flow being iteratively executed in an extremely short cycle time of the order of several msec to several tens of msec for example. FIG. 7 corresponds to the flowchart of FIG. 5 and hence different steps therebetween will mainly be described hereinbelow.

In FIG. 7, if the determination at S80 is negative or if the determination at S100 is affirmative, at S110' corresponding to the power supply switching control means 126, for example the power supply state of the vehicle 10 is switched to the running power off state (IG-ON state+READY-OFF state, or ACC-ON state) for the "emergency stop process". Next, at S120 corresponding to the P position settlement determining means 120, determination is made of for example whether the P position is settled. If the determination at S120 is affirmative, at S130' corresponding to the power supply switching control means 126, for example the power supply state of the vehicle 10 is switched from the running power off state (IG-ON state+READY-OFF state, or ACC-ON state) to the ALL-OFF state. On the other hand, if the determination at S120 is negative, at S140' also corresponding to the power supply switching control means 126, for example the running power off state (IG-ON state+READY-OFF state, or ACC-ON state) for the "emergency stop process" continues (remains) unchanged.

As described above, according to this embodiment, in place of the above embodiment, the first state of the vehicle state is the running power on state (IG-ON state-+READY-ON state) in the power supply state of the vehicle 10 and the second state of the vehicle state is the running power off state (IG-ON state+READY-OFF state, or ACC-ON state) in the power supply state of the vehicle 10, while the respective vehicle states in the first state, the second state, and the third state are substantially the same as those of the above embodiment and therefore this embodiment also offers similar effects to those of the above embodiment.

Although the embodiments of the present invention have been described in detail with reference to the drawings, the present invention is applicable in the other modes.

For example, although in the embodiments the predetermined switching time $T_P$ for delaying the execution of the "emergency IG-OFF action" was a time required to securely switch the shift position to the P position by the actuation of the parking lock device 16, if the shift position can be switched to the P position by the parking lock device 16 actuated by the P-ECU 106 regardless of being in the ACC-ON state, the predetermined switching time $T_P$ may be for example an execution standby time for the "emergency IG-OFF action" that is previously found as a time required for the HV-ECU 104 to securely receive the auto-P request signal output from the PM-ECU 102 via the multiplex communication line 60. In such a case, the assumption is that the signals such as the auto-P request signal and the auto-P completion signal are sent and received by way of the multiplex communication line 60 as disabled when for example the power supply state of the vehicle 10 is the IG-OFF state. The present invention can be performed in such manners Although in the embodiments three computers (ECUs), i.e., the PM-ECU 102, the HV-ECU 104, and the P-ECU 106 are used by way of example as the computers involved in the switching control of the actuation state of the parking lock device 16 and in the switching control of the power supply state of the vehicle 10, this is not limitative and various modes can be employed. For example, one mode may be such that two computers (ECUs), i.e., the PM-ECU 102 and the P-ECU 106 are disposed that incorporate the functions possessed by the HV-ECU 104 such as functions associated with the hybrid control so that the signals, etc. interchanged between the PM-ECU 102 and the P-ECU 106 are directly sent or received without via the HV-ECU 104. Another mode may be such that the PM-ECU 102 incorporating the functions of the HV-ECU 104 internally processes the sending/receiving of signals between the HV-ECU 104 and the PM-ECU 102 or such that the PM-ECU 102 processes them via the external multiplex communication line 60. In a further mode, a single computer (ECU) may implement functions of the PM-ECU 102, the HV-ECU 104, and the P-ECU 106 for example. The present invention is applicable to these modes.

Although in the embodiments the power supply switching control means 126 switches the power supply state of the vehicle 10 to the ACC-ON state for the "emergency IG-OFF action" when the P switching time determining means 124 determines that the timer count T reaches the predetermined switching time $T_P$ or more, the "auto-P action" may be executed preferentially over the "emergency IG-OFF action" if the switch operation determining means 112 determines that the successive switch operation count N reaches the predetermined number of times $N_{SW}$ or more and if the auto-P request occurrence determining means 122 determines that the output of the auto-P request signal occurs.

Although in the embodiments "during the vehicle running where the vehicle speed V exceeds the predetermined vehicle speed V'" is exemplified as the "during the vehicle running" in determining the fulfillment of the condition for the execution of the "emergency IG-OFF action", the "during the vehicle running" is not necessarily limited to the "during the vehicle running where the vehicle speed V exceeds the predetermined vehicle speed V'". For example, the "during the vehicle running" may be "during the vehicle running where the vehicle speed V exceeds a predetermined vehicle speed V2' that is higher than the predetermined vehicle speed V' or may be "during the vehicle running where the vehicle speed V exceeds a predetermined vehicle speed V3' that is lower than the predetermined vehicle speed V'.

Although the embodiments use two vehicle speed signals i.e. the vehicle speed signal V1 that is sent/received via the multiplex communication line 60 and the meter indication vehicle speed signal V2, the two vehicle speed signals may not necessarily be used and naturally a mode using either vehicle speed signal is also feasible. Another mode is also feasible that uses the vehicle speed V based on the output rotation speed $N_{OUT}$ output from the output rotation sensor 44 for example instead of using the vehicle speed V based on the wheel speed pulse signal $N_W$ output from the wheel speed sensor 48.

Although the vehicle power switch 40 of the embodiments was a momentary push-button switch, it may be replaced by a momentary lever switch or a slide switch for example.

Although in the embodiments the shift lever 32 is two-dimensionally shift-operated, it may be operated along one axis or may be operated three-dimensionally.

Although the embodiments have the shift sensor 36 and the select sensor 38 as position sensors for detecting the position of the shift lever 32, the number of the position sensors is not limited to two.

Although the shift lever 32 of the embodiments was a momentary lever switch that is operated to a plurality of different shift positions $P_{SH}$, it may be replaced by a push-button switch, a slide switch, etc. for example. Furthermore, the shift operation device 30 may be shift-operated by foot instead of the manual operation or may be shift-operated in response to the driver's voice. Though separated from the P switch 34, it may further include the parking position so as to have the function of the P switch 34. It may include the P switch 34 and may not be of a momentary type. The present invention is applicable also to these modes.

The above are mere embodiments and the present invention may be carried out in variously modified or improved modes based on the knowledge of those skilled in the art.

NOMENCLATURE OF ELEMENTS

10: vehicle
16: parking lock device
40: vehicle power switch (push-button switch)
100: electronic control device (vehicle shift control device)
102: power control computer (power control device, vehicle state switching control device)
106: parking control computer (parking lock control device)

The invention claimed is:

1. A vehicle shift control device electrically switching a shift position associated with running of a vehicle between a parking position and a non-parking position through switching a parking lock device between a lock state and a non-lock state by actuating the parking lock device based on a predetermined request signal,
   the vehicle being capable of switching a vehicle state among a first state for enabling the vehicle running, a second state for turning off a function associated with the vehicle running and turning on a function not associated with the vehicle running, and a third state for turning off both the function associated with the vehicle running and the function not associated with the vehicle running,
   when an operation for switching the vehicle state is performed in the first state, on condition that a vehicle speed is a predetermined vehicle speed for determining a vehicle stop state or less, switching is executed from a shift position other than the parking position to the parking position and, after the completion of the switching, the vehicle state is switched to the third state, whereas when plural-times of the operations are performed successively during the vehicle running, the vehicle state is compulsorily switched to the second state, and
   when at least one operation of the plural-times of the operations is performed on condition that the vehicle speed is the predetermined vehicle speed or less, switching to the parking position is executed prior to switching to the second state.

2. The vehicle shift control device of claim 1, wherein
   when at least one operation of the plural-times of the operations is performed on the condition that the vehicle speed is the predetermined vehicle speed or less, the vehicle state is further switched from the second state to the third state after the completion of the switching to the parking position.

3. The vehicle shift control device of claim 1, comprising a vehicle state switching control device for switching the vehicle state and a parking lock control device for switching a state of the parking lock device between the lock state and the non-lock state based on the predetermined request signal, wherein
   when at least one operation of the plural-times of the operations is performed on the condition that the vehicle speed is the predetermined vehicle speed or less, the vehicle state switching control device executes the switching to the second state after an elapse of a predetermined switching time that is predetermined as a time up to the execution of the switching to the parking position by the parking lock control device.

4. The vehicle shift control device of claim 2, comprising a vehicle state switching control device for switching the vehicle state and a parking lock control device for switching a state of the parking lock device between the lock state and the non-lock state based on the predetermined request signal, wherein
   when at least one operation of the plural-times of the operations is performed on the condition that the vehicle speed is the predetermined vehicle speed or less, the vehicle state switching control device executes the switching to the second state after an elapse of a predetermined switching time that is predetermined as a time up to the execution of the switching to the parking position by the parking lock control device.

5. The vehicle shift control device of claim 1, comprising a momentary push-button switch operated to switch the vehicle state, wherein
   the operation for switching the vehicle state is a press operation of the push-button switch, wherein
   the plural-times of the operations are plural-times of successive press operations where each of operation intervals between the successive press operations is within a predetermined time and where number of times of the press operations is a predetermined number of times or more.

6. The vehicle shift control device of claim 2, comprising a momentary push-button switch operated to switch the vehicle state, wherein
   the operation for switching the vehicle state is a press operation of the push-button switch, wherein
   the plural-times of the operations are plural-times of successive press operations where each of operation intervals between the successive press operations is within a predetermined time and where number of times of the press operations is a predetermined number of times or more.

7. The vehicle shift control device of claim 3, comprising a momentary push-button switch operated to switch the vehicle state, wherein the operation for switching the vehicle state is a press operation of the push-button switch, wherein the plural-times of the operations are plural-times of successive press operations where each of operation intervals between the successive press operations is within a predetermined time and where number of times of the press operations is a predetermined number of times or more.

8. The vehicle shift control device of claim 4, comprising a momentary push-button switch operated to switch the vehicle state, wherein the operation for switching the vehicle state is a press operation of the push-button switch, wherein the plural-times of the operations are plural-times of successive press operations where each of operation intervals between the successive press operations is within a predetermined time and where number of times of the press operations is a predetermined number of times or more.

9. The vehicle shift control device of claim 1, wherein
the vehicle state is a power supply state of the vehicle, wherein
the first state is a power on state for enabling the vehicle running, wherein
the second state is a partial power on state for turning off a power associated with the vehicle running and turning on a power not associated with the vehicle running, and wherein
the third state is a power off state for turning off both the power associated with the vehicle running and the power not associated with the vehicle running.

10. The vehicle shift control device of claim 2, wherein
the vehicle state is a power supply state of the vehicle, wherein
the first state is a power on state for enabling the vehicle running, wherein
the second state is a partial power on state for turning off a power associated with the vehicle running and turning on a power not associated with the vehicle running, and wherein
the third state is a power off state for turning off both the power associated with the vehicle running and the power not associated with the vehicle running.

11. The vehicle shift control device of claim 3, wherein
the vehicle state is a power supply state of the vehicle, wherein
the first state is a power on state for enabling the vehicle running, wherein
the second state is a partial power on state for turning off a power associated with the vehicle running and turning on a power not associated with the vehicle running, and wherein
the third state is a power off state for turning off both the power associated with the vehicle running and the power not associated with the vehicle running.

12. The vehicle shift control device of claim 4, wherein
the vehicle state is a power supply state of the vehicle, wherein
the first state is a power on state for enabling the vehicle running, wherein
the second state is a partial power on state for turning off a power associated with the vehicle running and turning on a power not associated with the vehicle running, and wherein
the third state is a power off state for turning off both the power associated with the vehicle running and the power not associated with the vehicle running.

13. The vehicle shift control device of claim 5, wherein
the vehicle state is a power supply state of the vehicle, wherein
the first state is a power on state for enabling the vehicle running, wherein
the second state is a partial power on state for turning off a power associated with the vehicle running and turning on a power not associated with the vehicle running, and wherein
the third state is a power off state for turning off both the power associated with the vehicle running and the power not associated with the vehicle running.

14. The vehicle shift control device of claim 6, wherein
the vehicle state is a power supply state of the vehicle, wherein
the first state is a power on state for enabling the vehicle running, wherein
the second state is a partial power on state for turning off a power associated with the vehicle running and turning on a power not associated with the vehicle running, and wherein
the third state is a power off state for turning off both the power associated with the vehicle running and the power not associated with the vehicle running.

15. The vehicle shift control device of claim 7, wherein
the vehicle state is a power supply state of the vehicle, wherein
the first state is a power on state for enabling the vehicle running, wherein
the second state is a partial power on state for turning off a power associated with the vehicle running and turning on a power not associated with the vehicle running, and wherein
the third state is a power off state for turning off both the power associated with the vehicle running and the power not associated with the vehicle running.

16. The vehicle shift control device of claim 8, wherein
the vehicle state is a power supply state of the vehicle, wherein
the first state is a power on state for enabling the vehicle running, wherein
the second state is a partial power on state for turning off a power associated with the vehicle running and turning on a power not associated with the vehicle running, and wherein
the third state is a power off state for turning off both the power associated with the vehicle running and the power not associated with the vehicle running.

17. The vehicle shift control device of claim 1, wherein
the vehicle state is a power supply state of the vehicle, wherein
the first state is a running power on state for performing the vehicle running, wherein
the second state is a running power off state for disabling the vehicle running and turning on a power not associated with the vehicle running, and wherein
the third state is a vehicle power off state for turning off both a power associated with the vehicle running and the power not associated with the vehicle running.

18. The vehicle shift control device of claim 2, wherein
the vehicle state is a power supply state of the vehicle, wherein
the first state is a running power on state for performing the vehicle running, wherein
the second state is a running power off state for disabling the vehicle running and turning on a power not associated with the vehicle running, and wherein the third state is a vehicle power off state for turning off both a power associated with the vehicle running and the power not associated with the vehicle running.

19. The vehicle shift control device of claim 9, comprising a power control device for switching the power supply state and a parking lock control device for switching the lock state of the parking lock device between the lock state and the non-lock state based on the predetermined request signal, wherein when at least one operation of the plural-times of the operations is performed on the condition that the vehicle speed is the predetermined vehicle speed or less, the power control device executes the switching to the partial power on state or to the running power off state after an elapse of a predetermined switching time that is predetermined as a time up to the execution of the switching to the parking position by the parking lock control device.

20. The vehicle shift control device of claim 17, comprising a power control device for switching the power supply state and a parking lock control device for switching the lock state of the parking lock device between the lock state and the non-lock state based on the predetermined request signal, wherein when at least one operation of the plural-times of the operations is performed on the condition that the vehicle speed is the predetermined vehicle speed or less, the power control device executes the switching to the partial power on state or to the running power off state after an elapse of a predetermined switching time that is predetermined as a time up to the execution of the switching to the parking position by the parking lock control device.

* * * * *